United States Patent [19]

Thomas

[11] 4,418,353

[45] Nov. 29, 1983

[54] INK CONTROL FOR INK JET PRINTER

[75] Inventor: Jacob E. Thomas, Ithaca, N.Y.

[73] Assignee: NCR Corporation, Dayton, Ohio

[21] Appl. No.: 385,966

[22] Filed: Jun. 7, 1982

[51] Int. Cl.³ .............................................. G01D 15/18

[52] U.S. Cl. .................................. 346/140 R; 138/30

[58] Field of Search .................... 346/140 PD, 140 R; 137/593, 207; 138/26, 30

[56] References Cited

U.S. PATENT DOCUMENTS 3,536,102 10/1970 Allewitz ................................ 138/30

3,683,212 8/1972 Zoltan ............................ 346/140 X 3,832,579 8/1974 Arndt .............................. 346/140 X 4,149,172 4/1979 Heinzl .............................. 346/140 R 4,354,197 10/1982 Reitberger ...................... 346/140 R

*Primary Examiner*—Joseph W. Hartary

*Attorney, Agent, or Firm*—J. T. Cavender; Wilbert Hawk, Jr.; George J. Muckenthaler

[57] ABSTRACT

A short tapered elastomer tube carries ink from a reservoir to an ink jet print head. The tube has a substantially constant inside diameter throughout the length thereof and a decreasing outside diameter along a portion of the length to provide a thin wall section for absorbing return pressure waves generated from the nozzle of the print head.

14 Claims, 1 Drawing Figure

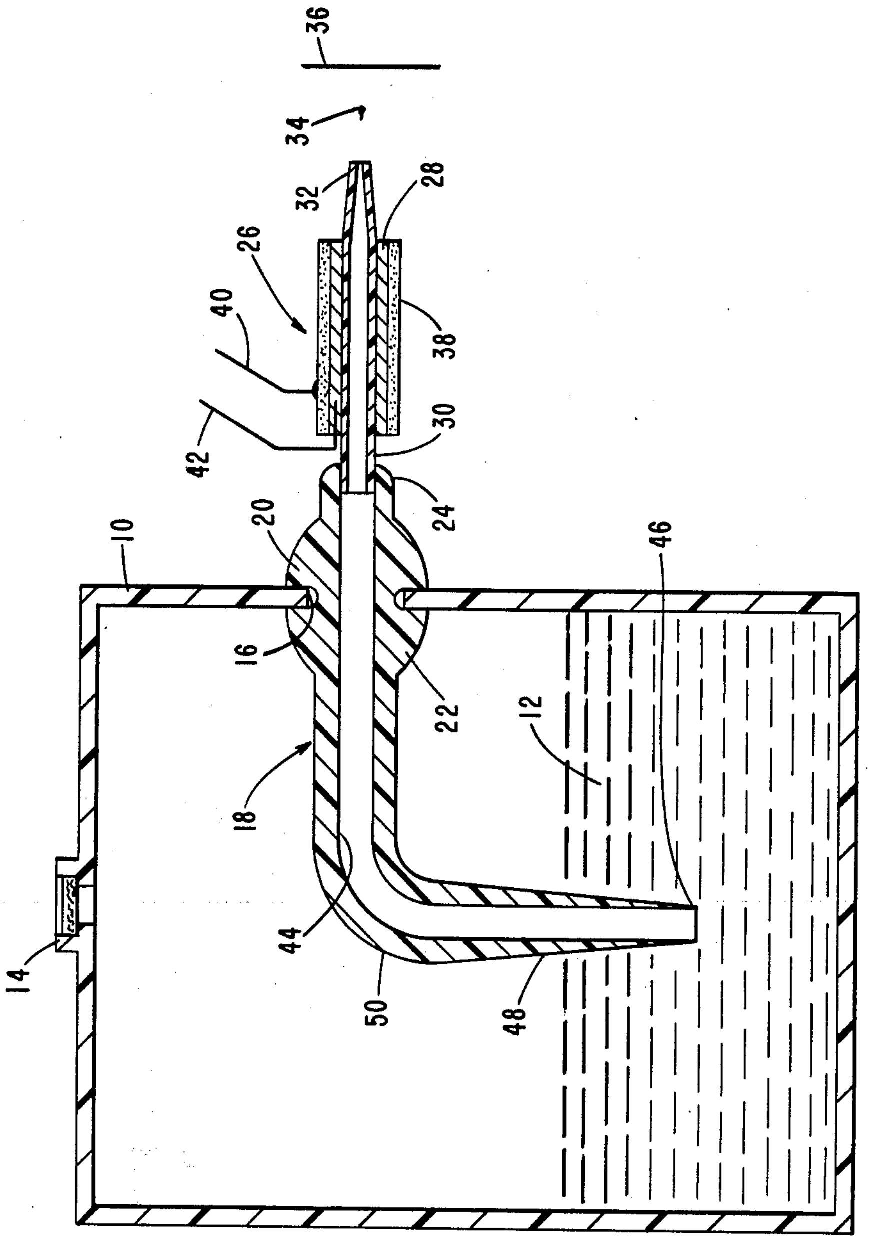
36
34
32
28
26
40
38
42
30
24
20
10
46
16
22
12
18
44
14
50
48

INK CONTROL FOR INK JET PRINTER

CROSS-REFERENCE TO RELATED APPLICATIONS

Ink Evaporation Prevention Means For Ink Jet Printer, co-pending application Ser. No. 385,956 filed June 7, 1982, on even date herewith, invented by Jacob E. Thomas and James K. McKnight, and assigned to NCR Corporation.

Ink Level Control For Ink Jet Printer, co-pending application Ser. No. 385,965 filed June 7, 1982, filed on even date herewith, invented by Jacob E. Thomas, and assigned to NCR Corporation.

Ink Level Control For Ink Jet Printer, co-pending application Ser. No. 385,955 filed June 7, 1982, filed on even date herewith, invented by Richard G. Bangs and Jacob E. Thomas, and assigned to NCR Corporation.

Ink Control For Ink Jet Printer, co-pending application Ser. No. 385,967 filed June 7, 1982, filed on even date herewith, invented by Jacob E. Thomas, and assigned to NCR Corporation.

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be both precise and accurate from the time of formation of the droplets to depositing of such droplets on paper or like record media and to make certain that a clean printed character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high-speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner.

Alternatively, the printer structure may include a plurality of equally-spaced horizontally-aligned single nozzle print heads which are caused to be moved in back-and-forth manner to print successive lines of dots in making up the lines of characters. In this latter arrangement, the drive elements or transducers are individually supported along a line of printing.

In a still different structure, the nozzles are spaced in both horizontal and vertical directions, and the vertical distance between centers of the ink jets equals the desired vertical distance between one dot and the next adjacent dot above or below the one dot on the paper. The horizontal distance is chosen to be as small as mechanically convenient without causing interference between the actuators, reservoirs, and feed tubes associated with the individual jets. The axes of all jets are aligned approximately parallel to each other and approximately perpendicular to the paper. Thus, if all nozzles were simultaneously actuated, a sloped or slanted row of dots would appear on the paper and show the dots spaced both horizontally and vertically. In order to produce a useful result consisting of dots arranged as characters, it is necessary to sweep the ink jet head array back and forth across the paper, and actuate each individual nozzle separately when it is properly located to lay down a dot in the desired position. A vertical row of dots is created by sequentially actuating the nozzles rather than simultaneous actuation, the latter being the preferred practice in the more common nozzle arrangements.

A further observation in ink jet printers is that previous and current designs for drop-on-demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

The use of a fast-acting valve to control the flow of ink to a single ink jet printing nozzle is known in specific applications, but in certain cases, the concept and heretofore-known structure has been considered costly and impractical. Additionally, the supply of ink to a plurality of ink jet nozzles may be controlled by means of a single control device wherein the nozzles are connected to a common manifold and ink droplet ejection is accomplished by momentarily increasing the pressure in the manifold.

After the droplets of ink have been ejected from the nozzles, the ink is replenished thereat from a remote supply by the capillary action of the meniscus at the end of the nozzle. In certain of the control devices and arrangements, it has been found that some difficulties arise from the capillary action refill or replenish process and there are adverse effects on the performance and reliability of such printers.

In normal operation of an ink jet print head, it is well-known that a negative meniscus of ink should be maintained at the nozzle, that the relative levels of ink in the various parts or areas of the system have an effect on the printing operation, and further, that the movement of the several printer elements affects the flow of ink during the printing cycle.

An additional observation in the operation of an ink jet printer of the drop-on-demand type is that each time a drop of ink is ejected from the nozzle, a pressure wave originates thereat and travels back toward the reservoir of ink. Such pressure wave then may return toward the nozzle in a reflected manner of action and movement and cause faulty performance in the printing operation. It is of concern in the operation that such pressure waves are controlled in a manner so as not to affect the printing, or at least tc minimize the effect of any such wave motion thereon.

Representative documentation in the field of ink control means for ink jet printers includes U.S. Pat. No. 3,832,579, issued to J. P. Arndt on Aug. 27, 1974, which discloses energy absorbing means coupled to the liquid for absorbing pressure waves therein. Such means include conduit walls of visco-elastic material which deform and absorb energy, and also several forms of acoustic resistance elements within the conduit at the inlet end.

U.S. Pat. No. 4,095,237, issued to J. R. Amberntsson on June 13, 1978, discloses an ink reservoir which follows the print head and has a filter in the flow path of the ink to provide capillary action to prevent passage of air from the reservoir to the head.

U.S. Pat. No. 4,354,197, issued to P. Reitberger on Oct. 12, 1982, discloses various means for damping pressure waves in the fluid and including a hose of soft wall material, a hose shaped to include an exponential section, and chambers within the ink supply line containing flow inhibiting material.

SUMMARY OF THE INVENTION

The present invention relates to ink jet printers, and more particularly, to means for damping or inhibiting the pressure waves that originate at the print head nozzle upon actuation of the print head and for minimizing the effect of such pressure waves on the printing operation. A supply tube of elastomeric vinyl material is disposed with one end thereof immersed in the ink reservoir and the other end connected to the print head. The tube has an inside diameter which is substantially constant throughout the length of the tube and has an outside diameter which decreases along a portion of the length thereof spaced from the end that is connected to the print head and to the end immersed in the ink, wherein such latter end diameter approaches the inside diameter of the tube. The ink reservoir is carried on a carriage movable in back-and-forth manner relative to paper or like record media, and has at least one print head supported from and carried therewith in reciprocating manner during printing operation.

The apparatus and arrangement provides for controlling the pressure waves originating at the print head nozzle and the thin walled, pliant tube enables stretching near the end thereof to absorb the pressure waves. The smooth variation of the wall thickness of the tube along a portion of its length allows the waves to spend energy in the thin wall portion and not be reflected in the direction back to the nozzle.

In view of the above discussion, the principal object of the present invention is to provide means for controlling the flow of ink through a supply line to a print head.

Another object of the present invention is to provide means for smoothing the flow of ink from a supply thereof to at least one ink jet nozzle.

An additional object of the present invention is to provide means for smoothly controlling the flow of ink to the ink jet print head after each printing operation.

A further object of the present invention is to provide an ink supply tube having a substantially constant inside diameter and a gradually decreasing outside diameter approaching the inside diameter at one end of the tube for absorbing back pressure waves of ink from the ink jet nozzle.

Additional advantages and features of the present invention will become apparent and fully understood from a reading of the following description taken together with the annexed drawing.

BRIEF DESCRIPTION OF THE DRAWING

The single FIGURE is a diagrammatic view, partly in section, of a printing system incorporating the subject matter of the present invention.

DESCRIPTION OF THE PREFERRED EMBODIMENT

As seen in the single FIGURE of the drawing, an ink reservoir 10 contains a supply of ink 12 which is sufficient for printing in excess of several million characters. The ink reservoir 10 has a filter-type vent 14 suitably disposed in the top thereof for access to the atmosphere. The reservoir 10 also includes an opening 16 in one side wall thereof for receiving a molded elastomer member 18 which is formed to include an enlarged portion 20 on the outer side of the reservoir wall and a similar enlarged portion 22 on the inner side of the reservoir wall and wherein such enlarged portions provide a fluid-tight connection with the wall of the reservoir. The elastomer member 18 is in the form of a conduit or tube which terminates with one end 24 outside the reservoir 10 and which is connected with an ink jet print head 26.

The print head 26 includes a body portion 28 of cylindrical form having a glass tube or glass-lined passageway 30 through the body portion and terminating in a nozzle 32 for ejecting a droplet 34 of printing ink to be applied to record media 36, which media may be in the form of paper or the like, and supported in suitable manner around a drum or from a platen (not shown).

The print head 26 may be of a type as disclosed in Arndt U.S. Pat. No. 3,832,579, appropriate for and commonly used in ink jet printing operations, and which includes a piezoelectric device or tubular type transducer 38 for causing ejection of the ink droplets 34, either in synchronous or asynchronous manner, from the print head nozzle 32. The ink droplets, so produced from the nozzle 32, are essentially the same or constant in size and are normally ejected at a constant velocity. Leads 40 and 42 are appropriately connected to the print head 26 for actuating the transducer 38 to cause ejection of the ink droplets 34 in well-known manner.

The elastomer member 18, in the form of an L-shaped ink supply tube, is formed with an inside opening 44 which is substantially constant throughout the length of the tube and running from the outer end 24 connected to the print head 26 and extending to a downturned opposite end 46 which is immersed in the printing ink 12 within the reservoir 10. Starting at a point upstream from the enlarged portion 22 of the member 18, the wall thickness thereof gradually decreases and results in a decreasing outside diameter portion 48 down to the end 46. The decreasing wall thickness provides the flexible and pliant elongated portion 48 of the tube generally beyond the bend 50 thereof, which portion 48 allows the pressure waves returning from the nozzle 32, after actuation of the print head in ejecting an ink droplet 34, to expend energy in stretching or flexing the tube radially outwardly along the wall portion 48 above the reduced diameter inlet end 46. Since there is at least minimal or no great change in the dimensions of the tube 18 over a distance along the length thereof comparable to the wave lengths of sound associated with pressure waves, such pressure waves are absorbed by the flexible and pliant portion 48 of the tube, rather than being reflected back in the direction toward the nozzle. The elastomer member or tube 18 utilized in the reservoir 10 may be made of Tygon (a polyvinyl chloride material manufactured by The Norton Chemical Company).

A variation in the design of the ink supply member 18 is to gradually increase the inside diameter toward the inlet end 46 immersed within the ink so as to define a member generally in the form of a horn or one that is horn-shaped. The flared end of the horn may be round or such end may be flattened to allow several nozzles to be placed closer together. It is known that an acoustic transducer at the small end of a horn has efficient transfer of sound to the medium in which the horn is immersed and it is thus seen that a sound wave originating at the nozzle expends or dissipates all its energy in the ink of the reservoir in a case where the inlet end is properly flared. In this regard, the ideal shape for a horn-shaped member is "exponential" in form wherein the diameter increases exponentially with distance measured along the axis.

It is thus seen that herein shown and described is an ink jet printing system which includes an elastomer member which is formed in a decreasing wall thickness manner to absorb any pressure waves originating from the nozzle of the ink jet printer after ejection of the ink droplet. The apparatus of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

I claim:

1. Means for absorbing pressure waves in an ink jet printing system comprising a reservoir containing a supply of ink therein, means operably associated with said supply of ink for ejecting ink in droplet form, and conduit means carrying ink from said supply thereof to said ink ejecting means, said conduit means formed to have a substantially constant inside diameter passageway therethrough and having a portion decreasing in outside diameter for a distance in a direction away from said ink ejecting means and terminating in an ink inlet end immersed in said supply of ink whereby said decreased diameter portion is responsive to absorb pressure waves by reason of the decreasing wall thickness of said portion.

2. The subject matter of claim 1 wherein said ink ejecting means is a tubular transducer.

3. The subject matter of claim 1 wherein said conduit means is a resilient tube having said inlet end of minimum wall thickness.

4. The subject matter of claim 1 wherein said conduit means is an elastomer tube having a portion adapted for fitting an aperture in said reservoir and a decreasing diameter portion extending therefrom to said inlet end of the tube whereby the wall thickness enables flexing of the decreased diameter portion of said tube to absorb pressure waves returned from actuation of the ink ejecting means.

5. Pressure wave absorbing means comprising reservoir containing a supply of ink therein, means operably associated with said reservoir for ejecting ink in droplet form, and conduit means connected at one end thereof with said ink ejecting means and having the other end immersed in ink in said reservoir, said conduit means having a substantially constant inside diameter passageway extending therethrough and having the outside diameter thereof decreasing from said one end to said other end for providing a pliant portion at the supply end to absorb return pressure waves resulting from actuation of said ink ejecting means.

6. The subject matter of claim 5 wherein said ink ejecting means is a tubular transducer.

7. The subject matter of claim 5 wherein said conduit means is a resilient tube having said other end of minimun wall thickness.

8. The subject matter of claim 5 wherein said conduit means is an elastomer tube fitting into an aperture of the reservoir and connected with the ink ejecting means and wherein the decreased diameter portion of the tube at the supply end is of minimum wall thickness to absorb said pressure waves.

9. In an ink jet printer, means containing a supply of ink therein, means operably associated with the supply means for ejecting ink in printing operations, and resilient conduit means connected with said ink ejecting means and extending therefrom into the supply of ink and formed to provide a nominal inside diameter and an elongated decreasing wall portion responsive to receive return pressure waves in the ink resulting from operation of the ink ejecting means and absorb such waves by flexure of the elongated portion.

10. In the printer of claim 9 wherein said ink supply means is a reservoir having an aperture in one wall thereof and said conduit means includes a portion fitting in said aperture and supporting said ink ejecting means.

11. In the printer of claim 9 wherein said ink ejecting means is a tubular transducer.

12. In the printer of claim 9 wherein said conduit means is a tubular member having a substantially constant inside diameter extending the length thereof and having a decreasing outside diameter portion proximal the supply of ink to provide minimum wall thickness for absorbing said return pressure waves in the ink.

13. In the printer of claim 10 wherein said aperture is formed in a side wall of said reservoir and said conduit means is an L-shaped tubular member having one leg thereof extending through said aperture, having a substantially constant inside diameter extending throughout the length thereof, and having said decreasing wall portion along the other leg thereof defining an inlet end of said tubular member of minimal wall thickness immersed in said supply of ink for absorbing said return pressure waves.

14. In the printer of claim 9 wherein said resilient conduit means is a tubular member having a substantially constant inside diameter extending throughout the length thereof and having a portion with a gradually decreasing outside diameter approaching the inside diameter at one end of the member for absorbing the return pressure waves in the ink.

* * * * *